United States Patent
Tsukasaki

(10) Patent No.: US 7,328,955 B2
(45) Date of Patent: Feb. 12, 2008

(54) CONTROL DEVICE FOR FOUR-WHEEL DRIVE VEHICLE

(75) Inventor: Yuichiro Tsukasaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 205 days.

(21) Appl. No.: 11/155,741

(22) Filed: Jun. 20, 2005

(65) Prior Publication Data

US 2005/0285442 A1    Dec. 29, 2005

(30) Foreign Application Priority Data

Jun. 25, 2004    (JP)    ............................. 2004-188741

(51) Int. Cl.
*B60T 8/62*    (2006.01)
(52) U.S. Cl. .................... 303/190; 180/244; 701/69
(58) Field of Classification Search ................ 303/190, 303/186, 188, 20, 2; 180/249, 247, 248, 180/233, 244, 245; 192/12 R, 13 R; 188/156, 188/2 D, 158, 106 P; 701/67, 69, 70, 89, 701/93, 96, 301
See application file for complete search history.

(56) References Cited

U.S. PATENT DOCUMENTS

| | | | | |
|---|---|---|---|---|
| 4,866,624 A | * | 9/1989 | Nishikawa et al. ............ 701/89 |
| 5,551,526 A | * | 9/1996 | Young et al. ................ 180/233 |
| 7,000,717 B2 | * | 2/2006 | Ai et al. ..................... 180/65.2 |
| 2005/0121248 A1 | * | 6/2005 | Ushiroda et al. ........... 180/248 |

FOREIGN PATENT DOCUMENTS

| | | | |
|---|---|---|---|
| DE | 3544288 A1 | * | 7/1986 |
| JP | 59114147 A | * | 7/1984 |
| JP | A-7-89420 | | 4/1995 |
| JP | P-3324859 | | 8/1995 |
| JP | 2003226231 A | * | 8/2003 |

* cited by examiner

Primary Examiner—Pam Rodriguez
(74) Attorney, Agent, or Firm—Smith, Gambrell & Russell, LLP

(57) ABSTRACT

When supplied with a signal for correcting a vehicle behavior is input from a brake controller, an electrically-driven parking brake controller releases actuation of an electrically-driven parking brake when the electrically-driven parking brake is actuated. When supplied with a brake control amount when abnormality occurs in a main brake system is input the electrically-driven parking brake controller drives electric motors to generate the brake control amount concerned. Furthermore, when supplied with the brake control amount of the electrically-driven parking brake 30 from an ACC system, the electrically-driven parking brake controller drives the electric motors to generate the brake control amount concerned. The front-and-rear driving force distribution controller directly couples the front shaft and the rear shaft when the electrically-driven parking brake is actuated.

15 Claims, 2 Drawing Sheets

CONTROL DEVICE FOR FOUR-WHEEL DRIVE VEHICLE

BACKGROUND OF THE INVENTION

1. Field of the Invention

The present invention relates to a control device for a four-wheel drive (All-Wheel-Drive) vehicle that has an electrically-driven parking brake for braking the rear wheels and freely distributes the driving force among the front and rear wheels.

2. Description of the Related Art

An electrically-driven parking brake which is actuated by an electrically-driven motor has been developed and practically used a sparking brakes for vehicles. JP-A-7-89420 discloses one of these electrically-driven parking brakes. According to JP-A-7-89420, the electrically-driven parking brake comprises a cylinder formed in a caliper, a freely-slidable piston disposed in the cylinder, a screw shaft for reciprocating the piston to a disc, a motor for actuating the screw shaft, a measuring mechanism that is provided to the screw shaft and controls the shift amount of the piston by brake press force occurring to the piston, and an electric control device for controlling the motor and the measuring mechanism.

Since the electrically-driven parking brake described in JP-A-7-89420 has a feature that it has a longer stop holding time as compared with a main brake using normal hydraulic pressure, and thus it can be applied to various vehicle control devices which have been recently practically used (for example, a preceding vehicle following control device, etc.). However, the electrically-driven parking brake brakes only the rear wheels, and thus the maximum generable braking force is low, so that the vehicle may be destabilized by the braking of only the rear wheels.

SUMMARY OF THE INVENTION

The present invention has been implemented in view of the foregoing situation, and has object to a control device for a four-wheel drive vehicle that can effectively prevent low maximum braking force and destabilization of the vehicle which cause problems when deceleration is carried out by an electrically-driven parking brake.

According to the present invention, a control device for a four-wheel drive vehicle including an electrically-driven parking brake control unit for freely actuating electrically-driven parking brakes provided to the rear wheels of the vehicle, and a front-and-rear driving force distribution control unit for controlling a clutch unit provided between a front shaft and a rear shaft to variably controlling the driving force distribution between the front and rear wheels, is characterized in that the front-and-rear driving force distribution control unit controls the clutch unit so that the front shaft and the rear shaft are directly coupled to each other when the electrically-driven parking brake is actuated.

According to the control device for the four-wheel drive vehicle, the low maximum braking force and the destabilization of the vehicle which cause problems when the deceleration is carried out by the electrically-driven parking brake can be prevented.

DETAILED DESCRIPTION OF THE PREFERRED EMBODIMENT

A preferred embodiment according to the present invention will be described hereunder with reference to the drawings.

Figure 1:
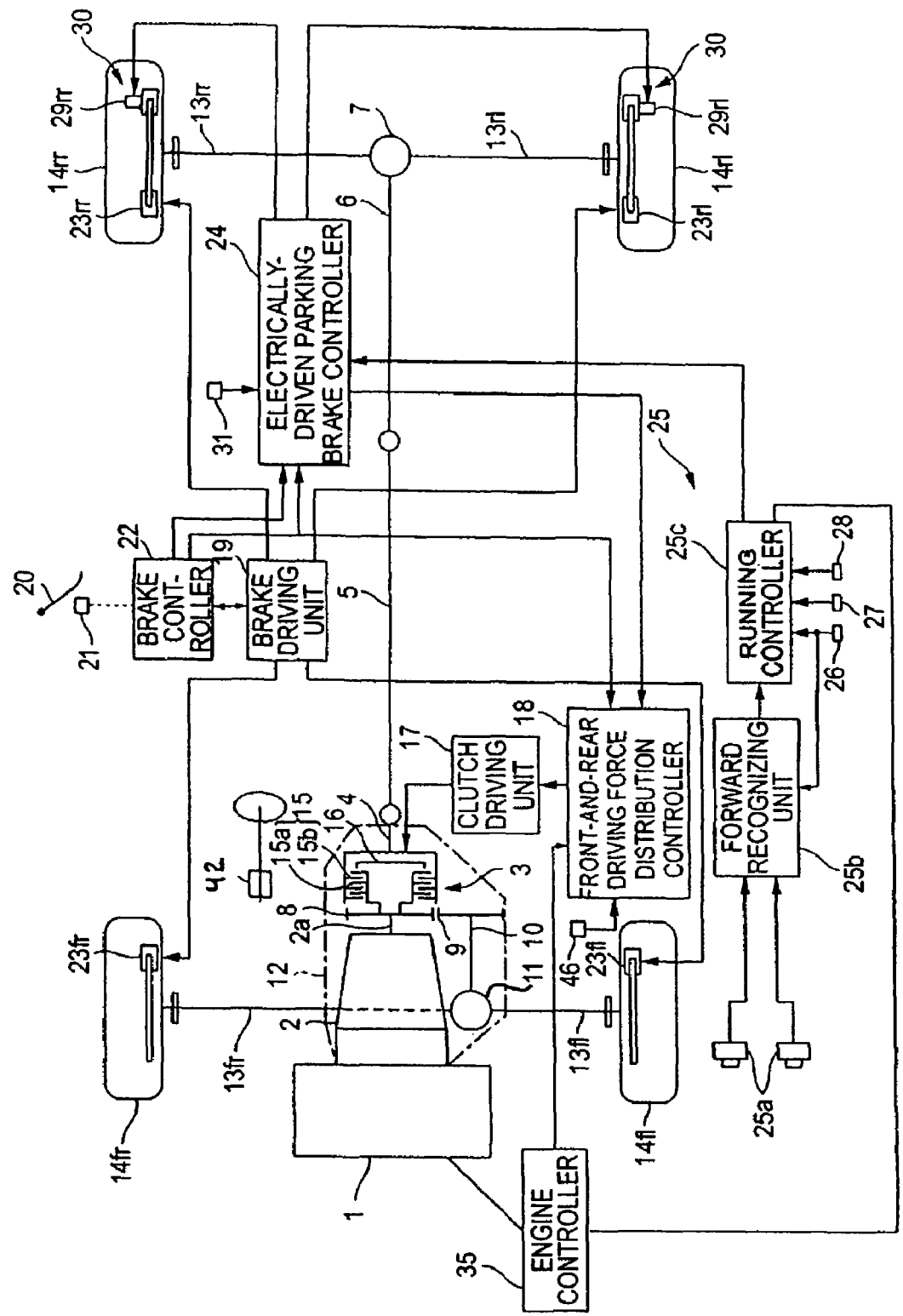
FIG. 1 is a schematic diagram showing a braking/driving system of a vehicle and each controller installed therein.

In FIG. 1, reference numeral 1 represents an engine disposed at the front side of the vehicle, and the driving force of the engine 1 is transmitted from an automatic transmission (illustrated as containing a torque converter, etc.) 2 at the rear side of the engine 1 through the output shaft 2a of the transmission to a transfer 3.

Furthermore, the driving force transmitted to the transfer 3 is input to a rear-wheel final reduction gear 7 through a rear drive shaft 4, a propeller shaft 5 and a drive pinion shaft unit 6, and also input to a front-wheel final reduction gear 11 through a reduction drive gear 8, a reduction driven gear 9 and a front drive shaft 10 serving as a drive pinion shaft unit. Here, the automatic transmission 2, the transfer 3, the front-wheel final reduction gear 11, etc. are integrally provided in a case 12.

Furthermore, the driving force input to the rear-wheel final reduction gear 7 is transmitted through a rear-wheel left driving shaft 13rl to a left rear wheel 14rl, and also input through a rear wheel right drive shaft 13rr to a right rear wheel 14rr. The driving force input to the front wheel final reduction gear 11 is transmitted through a front wheel left drive shaft 13fl to a left front wheel 14fl, and also transmitted through a front wheel right drive shaft 13fr to a right front wheel 14fr.

The transfer 3 comprises a wet multiple disc clutch (transfer clutch) 15 as clutch means containing a drive plate 15a provided to the reduction drive gear 8 side and a driven plate 15b provided to the rear drive shaft 4 side which are alternately laminated, and a transfer piston 16 for freely variably applying a fastening force (transfer clutch torque) of the transfer clutch 15. Accordingly, the vehicle controls a pressing force of the transfer piston 16 and also controls the transfer clutch torque of the transfer clutch 15, whereby the vehicle can be designed as a four-wheel drive vehicle based on a front engine/front drive vehicle base (FF base) in which the torque distribution ratio between the front and rear wheels can be varied between 100:0 and 50:50, for example, The pressing force of the transfer piston 16 is applied by a clutch driving unit 17 comprising a hydraulic circuit equipped with a plurality of solenoid valves, etc. A control signal for driving this clutch driving unit 17 (an output signal corresponding to the transfer clutch torque to the solenoid valves) is output from a front-and-rear driving force distribution controller 18 described later.

In FIG. 1, reference numeral 19 represents a brake driving unit (main brake) of the vehicle. The brake driving unit 19 is connected to a brake controller 22 for controlling a brake pedal force sensor 21 to detect pedal force of a brake pedal 20 operated by a driver and generating the brake force corresponding to the pedal force. That is, the mechanism of the main brake of this embodiment is a well-known electrical hydraulic brake, and when the driver operates the brake pedal 20, the pedal force of the brake pedal 20 is detected by the brake pedal force sensor 21, and brake pressure is introduced to each of the wheel cylinders 23fl, 23fr, 23rl, 23rr of the four wheels 14fl, 14fr, 14rl, 14rr through the brake driving unit 19 by the brake controller 22, whereby the four wheels are braked and thus the vehicle is braked.

The brake driving unit 19 is a hydraulic unit having a pressurization source, a pressure-reducing valve, a pressure-increasing valve, etc., and designed so as to freely and independently introduce brake pressure to each of the wheel cylinders 23fl, 23fr, 23rl, 23rr in accordance with an input signal from the brake controller 22 as described later in addition to the brake operation of the driver.

For example, the control of the brake controller 22 is performed as follows on the basis of each wheel speed from the wheel speed sensor provided to each wheel, a steering angle from a steering angle sensor 42, a yaw rate from a yaw rate sensor (each sensor in the brake controller 22 is not shown in FIG. 1) and specification of the vehicle. A derivative value of a target yaw rate, a differential value of an estimated yaw rate of low .mu.-road traveling and the deviation between both the differential values are calculated, the deviation between the actual yaw rate and the target yaw rate is calculated, and a target braking force for correcting an under-steer inclination or over-steer inclination of the vehicle on these values. In order to correct the under-steer inclination of the vehicle, a turn-direction inner rear wheel is selected as a brake wheel to which the brake force should be applied, and in order to correct the over-steer inclination, a turn-direction outer front wheel is selected as a brake wheel to which the brake force should be applied. Then, a control signal is output to the brake driving unit 19 to apply a target brake force to the selected wheel, thereby controlling the brake force. Here, an actuation signal in the brake controller 22, that is, an actuation signal which is being operated to correct the under-steer inclination or is being operated to correct the over-steer inclination is also output to the front-and-rear driving force distribution controller 18 and an electrically-driven parking brake controller 24 described later.

In the brake controller 22, failure diagnosis such as abnormality of current supply (breaking of wire) between the brake pedal force sensor 21 and the brake controller 22, etc. is carried out. For example when no current supply is carried out between the brake pedal force sensor 21 and the brake controller 22 and thus breaking of wire is judged, an alarm lamp (not shown) is turned on and also a signal indicating abnormality of the main brake system is output to the electrically-driven parking brake controller 24. Subsequently, a signal which has been output to the brake driving unit 19 is output as a substitute signal from the brake controller 22 to the brake controller 24. In a case where the brake controller 22 outputs the substitute signal to the electrically-driven parking brake controller 24 when the main brake system is abnormal, the substitute signal is preferentially output when it is overlapped with the signal for correcting the behavior of the vehicle described above. As described above, the brake controller 22 is designed to have the functions as a brake control unit and a vehicle behavior control unit.

In the vehicle of this embodiment is mounted a cruise control system equipped with a preceding vehicle following function (ACC (Adaptive Cruise Control) system) 25 serving as a running control unit for detecting a preceding vehicle running ahead of the vehicle concerned and freely controlling the deceleration of the vehicle concerned (own vehicle) on the basis of information of the preceding vehicle.

The ACC system 25 mainly comprises a stereo camera 25a, a forward recognizing unit 25b and a running controller 25c. The ACC system 25 basically controls the vehicle so that when there is no preceding vehicle, the vehicle runs with keeping a vehicle speed set by a driver under a constant-speed running control state, and also when there is a preceding vehicle, the vehicle runs with automatically following the preceding vehicle.

According to the automatic following control, for example, in such a case where a preceding vehicle exists, vehicle driving information corresponding to a driving operation of the driver is repetitively achieved when the driving operation is judged as a following drive state by the driver, and a control target value of the automatic following control is learned on the basis of the vehicle driving information thus achieved. Furthermore, when a preceding vehicle exists and the automatic following control is executed, the automatic brake control (containing following stop control), automatic acceleration control (containing following start control) or the like is carried out on the basis of the learned control target value.

The stereo camera 25a comprises a pair of (right and left) CCD cameras which use as a stereo optical system solid-state image pickup devices such as charge-coupled devices (CCD) or the like. The right and left CCD cameras are fixed at the front side of the ceiling of the vehicle room so as to be spaced at a fixed interval, and carry out a stereo image pickup operation on a target out of the vehicle from different view points respectively, and output the pickup images to the forward recognizing unit 25b.

The forward recognizing unit 25b is supplied with the images from the stereo camera 25a and the vehicle speed Vown of the vehicle concerned from the vehicle speed sensor 26, and detects forward information of solid object data in front of the vehicle concerned and white line data on the basis of the images from the stereo camera 25a to estimate the travel road of the vehicle concerned (vehicle travel road). Then, a preceding vehicle in front of the vehicle concerned is extracted, and the respective data of a preceding vehicle distance (the distance between the vehicle concerned and the preceding vehicle) D, a preceding vehicle speed ((variation of the preceding vehicle distance D)+ (vehicle speed Vown of the vehicle concerned)) Vfwd, a preceding vehicle acceleration (differential value of preceding vehicle speed Vfwd) afwd, the positions of stationary objects other than the preceding vehicle, white-line coordinates, a white-line recognition distance, vehicle travel road coordinates, etc. are output to the running controller 25c.

Here, the processing of the images from the stereo camera 25a in the forward recognizing unit 25b carried out as follows, for example. First, with respect to a pair of stereo images of the environment in the travel direction of the vehicle concerned which are picked up by the CCD cameras of the stereo camera 25a, distance information over the whole images is determined from the displacement amount between the corresponding positions of these stereo images according to the principle of the triangular surveying to thereby generate a distance image representing a three-dimensional distance distribution. These data are subjected to well-known grouping processing and also compared with three-dimensional road shape data, solid object data, etc. which are stored in advance, thereby extracting white-line data, guard rails existing along the road, side wall data of curb stones, etc. and solid object data of vehicles, etc. With respect to the solid object data, the distance to each solid object and the time-variation of the distance concerned (the relative speed to the vehicle concerned) are determined, and particularly a vehicle which is nearest to the vehicle concerned on the travel road of the vehicle concerned and travels in the same direction as the vehicle concerned at a prescribed speed is extracted as the preceding vehicle. Out of the preceding vehicles, a vehicle which approaches to the vehicle concerned at the same relative speed or substantially the same relative speed as the own vehicle speed (the speed of the vehicle concerned) Vown is recognized as a stopped preceding vehicle.

The running controller 25c implements the function of carrying out the constant-speed running control so as to keep the running speed set by a driver's input operation and the function of carrying out the automatic following control, and it is connected to the forward recognizing unit 25b, the vehicle speed sensor 26, a constant speed running switch 27 which comprises plural switches linked to a constant-speed running operation lever provided to the side portion of a steering column or the like, a brake switch 28, etc.

The constant-speed running switch 27 comprises a vehicle speed set switch for setting a target vehicle switch at the constant-speed running time, a course switch for mainly changing and setting the target vehicle speed to a lower speed, a resume switch for mainly changing and setting the target vehicle speed to a higher speed, etc. Furthermore, a main switch for carrying out ON/OFF of the constant-speed running control and the automatic following control is disposed in the neighborhood of the constant-speed running operation lever.

When the driver sets the main switch (not shown) to ON and sets a desired vehicle speed by using the constant-speed running operation lever, a signal from the constant-speed running switch 27 is input to the running controller 25c. A signal is output to an engine controller 35 to carry out feedback control on the opening valve of a throttle valve (not shown) so that the vehicle speed detected by the vehicle speed sensor 26 is converged to the vehicle speed set by the driver, so that the vehicle concerned is made to automatically run under the constant-speed state or a deceleration signal is output to an electrically-driven parking brake controller 24 to actuate the automatic brake.

Furthermore, when by the forward recognizing unit 25b the running controller 25c recognizes a preceding vehicle under the state that the constant-speed running control is carried out, the constant-speed running control is automatically switched to the automatic following control described later under a predetermined condition.

According to the automatic following control in the running controller 25c, the inter-vehicle distance (headway distance) D between the vehicle concerned and the preceding vehicle is divided by the own vehicle speed Vown (the speed of the vehicle concerned) to calculate an inter-vehicle time (headway time) Td. When the condition that a preceding vehicle exists and the inter-vehicle time Td is within a set range is continued for a set time under the state that the automatic following control is released (for example, the state where the main switch is set to OFF), this state is judged as the driver's following drive state. When the driver's following drive state is judged, the vehicle drive information corresponding to the driver's operation is repetitively achieved, and the control target value of the automatic following control is learned on the basis of the vehicle drive information. Furthermore, when the automatic following control is executed under the state that the main switch is set to ON, actuation signals are output to the engine controller 35 and the electrically-driven parking brake controller 24 on the basis of the control target value thus learned. The function of the constant-speed running control and the function of the automatic following control are automatically released when the driver steps on the brake pedal 20 or when the own vehicle speed Vown exceeds a preset upper limit value.

Here, the setting of the opening degree of the throttle in the following acceleration based on the automatic following control described above is performed by searching a preset map on the basis of the acceleration of the preceding vehicle and the own vehicle speed Vown while renewing the data through the above learning. Likewise, the setting of the brake control amount in the following deceleration based on the above automatic following control is performed by searching a preset map on the basis of the deceleration of the preceding vehicle and the own vehicle speed Vown while renewing the data through the above learning.

Furthermore, the rear wheels 14rl, 14rr of the vehicle are provided with well-known electrically-driven parking brakes 30 which are actuated by electrically-driven motors 29rl, 29rr as disclosed in JP-A-7-89420.

The electrically-driven parking brake 30 is driven on the basis of a signal from the electrically-driven parking brake controller 24, and the electrically-driven parking brake controller 24 is supplied with a signal for correcting the vehicle behavior from the brake controller 22 as described above, an abnormality signal of the main brake system and a brake control amount after the abnormality of the main brake system. Furthermore, the brake control amount of the electrically-driven parking brake 30 is input to the electrically-driven parking brake controller 24 from the running controller 25c of the ACC system 25. Furthermore, an electrically-driven parking brake actuating switch 31 for actuating the electrically-driven parking brake 30 by the driver is further connected to the electrically-driven parking brake controller 24.

When supplied with the signal for correcting the vehicle behavior from the brake controller 22, the electrically-driven parking brake controller 24 releases the actuation of the electrically-driven parking brake 30 when the electrically-driven parking brake 30 is actuated so as to prevent the interference with the correction of the vehicle behavior by the brake controller 22.

Furthermore, when supplied with the brake control amount based on the abnormality of the main brake system from the brake controller 22, the electrically-driven parking brake controller 24 drives the electrically-driven motors 29rl, 29rr to generate the brake control amount concerned.

Still furthermore, when supplied with the brake control amount of the electrically-driven parking brake 30 from the running controller 25c of the ACC system 25, the electrically-driven parking brake controller 24 drives the electrically-driven motors 29rl, 29rr to generate the brake control amount concerned.

When supplied with the signal from the electrically-driven parking brake actuating switch 31, the electrically-driven brake controller 24 actuates the electrically-driven parking brake 30 in preference to all the other signals.

As described above, the electrically-driven parking brake controller 24 also outputs the actuation state of the electrically-driven parking brake 30 to the front-and-rear driving force distribution controller 18. That is, the electrically-driven parking brake controller 24 is provided as an electrically-driven parking brake control unit.

Next, an example of the construction of the front-and-rear driving force distribution controller 18 provided as the front-and-rear driving force distribution control means described above will be described with reference to FIG. 2.

The front-and-rear driving force distribution controller 18 is supplied with respective wheel speeds $\omega fl$, $\omega fr$, $\omega rl$, $\omega rr$ from the four-wheel wheel speed sensors 41fl, 41fr, 41rl, 41rr, a steering angle OH from a steering angle sensor 42, a yaw rate $\gamma$ from a yaw rate sensor 43, an engine rotational number Ne and an engine output torque from the engine controller 35, a turbine rotational number Nt and a gear ratio i from the transmission controller 44, a road-surface μ estimation value μe from a road-surface μ estimating device 45, respective signals (respective signals for the braking force control) under under-steering inclination suppression, under over-steering inclination suppression or under non-operation from the brake controller 22, and the actuation signal of the electrically-driven parking brake from the electrically-driven parking brake controller 24. Furthermore, the front-and-rear driving force distribution controller 18 is connected to a clutch operation forcing release switch 46 as a switch unit which is turned on when the driver wants to daringly release the transfer clutch 15 while the electrically-driven parking brake 30 is actuated. In FIG. 1, the respective sensor group 41fl, 41fr, 41rl, 41rr, 42, 43 and the transmission controller 44, the road-surface μ estimating device 45 are omitted from the illustration in order to make the understanding easy.

On the basis of these input signals, a torque sensitive torque Tt, a differential rotation sensitive torque Ts and a yaw rate feedback torque Ty are calculated, and a transfer clutch torque Ttr is calculated form the respective torques. Furthermore, when the electrically-driven parking brake 30 is actuated, the transfer clutch torque Ttr is set to the preset maximum value and output to the clutch driving unit 17 to directly couple the front shaft and the rear shaft to each other.

Figure 2:
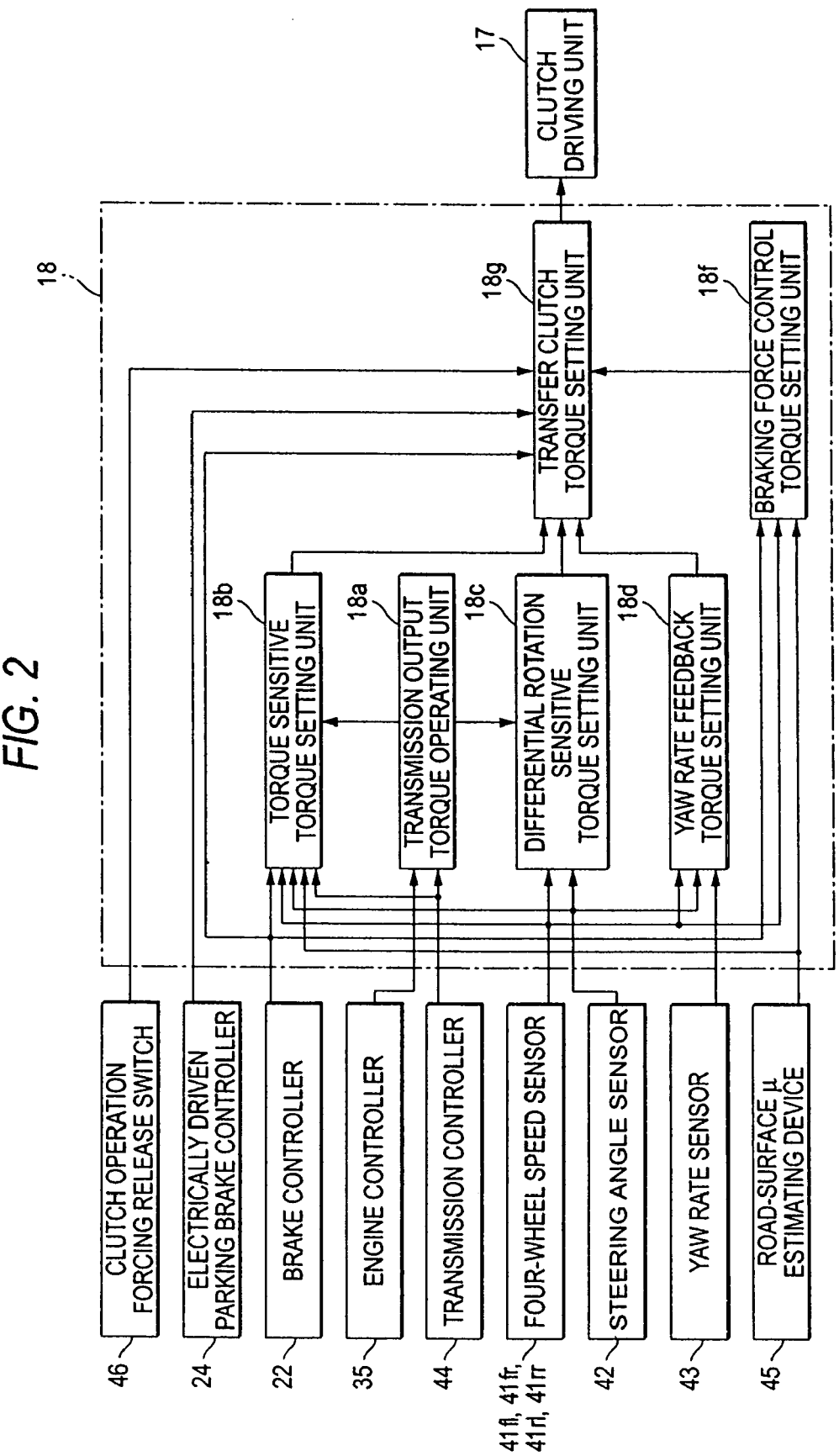
FIG. 2 is a functional block diagram showing a front-and-rear driving force distribution controller.

That is, as shown in FIG. 2, the front-and-rear driving force distribution controller 18 comprises a transmission output torque calculator 18a, a torque sensitive torque setting unit 18b, a differential rotation sensitive torque setting unit 18c, a yaw rate feedback torque setting unit 18d, a braking force control torque setting unit 18f and a transfer clutch torque setting unit 18g.

The transmission output torque calculator 18a is supplied with the engine rotational number Ne, the engine output torque Te, the turbine rotational number Nt and the gear ratio i, calculates a transmission output torque To from the following equation (1) and outputs the transmission output torque To to the torque sensitive torque setting unit 18b and the differential rotation sensitive torque setting unit 18c.

$$To = Te \cdot t \cdot i \quad (1)$$

Here, t represents the torque ration of the torque converter, and it is calculated by referring to a preset map between the rotational speed ratio e (=Nt/Ne) of the torque converter and the torque ratio t of the torque converter.

The torque sensitive torque setting unit 18b is supplied with the respective wheel speeds ωfl, ωfr, ωrl, ωrr, the handle angle θH, the gear ratio i, the road-surface μ estimation value μe, the signals under the under-steering inclination suppression, the over-steering inclination suppress or the non-actuation in the braking force control and the transmission output torque To, and the torque sensitive torque Tt is calculated and output to the transfer clutch torque setting unit 18g.

Specifically, in the torque sensitive torque setting unit 18b, a preset rear-wheel driving force distribution rate Ai is selected every gear ratio i and every suppression operation (during the under-steering inclination suppression, during the over-steering inclination suppression) when the braking force control is actuated, and the torque sensitive torques Tt is calculated from the rear-wheel driving force distribution ratio Ai and the transmission output torque To.

$$Tt = Ai \cdot To \quad (2)$$

The torque sensitive torque Tt is subjected to the torque reducing correction corresponding to the steering angle δf (=θH/n: n represents steering gear ratio) and the correction corresponding to the vehicle speed V (for example, the average of the wheel speeds ωfl, ωfr, ωrl, ωrr) in order to reduce the effect of a dragging torque based on steering.

$$Tt = f(\delta f) \cdot g(V) \cdot Tt \quad (3)$$

Furthermore, the torque sensitive Tt corrected by the equation (3) is restrictively set so that it is not less than the preset lower limit value every road-surface μ, and then output to the transfer clutch torque setting unit 18g.

The differential rotation sensitive torque setting unit 18c is supplied with the respective wheel speeds ωfl, ωfr, ωrl, ωrr, the handle angle θH and the transmission output torque To, calculates the differential rotation sensitive torque Ts by the following equation (4) and then output the calculation result to the transfer clutch torque setting unit 18g.

$$Ts = KT0 \cdot (\Delta N - \Delta N0) \quad (4)$$

Here, ΔN represents the differential (actual differential rotation) between the rotational speed (actual rotational speed) of the front shaft ωf (=(ωfl+ωfr)/2) and the actual rotational speed (actual rotational speed) of the rear shaft ωr (=(ωrl+ωrr)/2), that is, ΔN=ωr−ωf.

Furthermore, in the differential rotation (basic differential rotation) which necessarily occurs from the steering angle δf of the steering and the vehicle speed V, the following calculation is made by using a vehicle motion model.

$$\text{Turn radius } \rho cg \text{ of center-of-gravity point of vehicle} = (1 + A \cdot V^2) \cdot (1/\theta H/N) \quad (5)$$

$$\text{Slip angle } \beta cg \text{ of center-of-gravity point of vehicle} = ((1-(m/(2 \cdot L))(Lf/Lr \cdot Kr)) \cdot V^2)/(1+A \cdot V^2) \cdot (Lr/L) \cdot (\theta H/n) \quad (6)$$

Here, A represents a stability factor, m represents the mass of the vehicle, L represents a wheel base, Lf represents the distance between the front shaft and the center of gravity, and Lr represents the distance between the rear shaft and the center of gravity.

From the equations (5), (6), $$\text{Turn radius } \rho f \text{ of front shaft} = \rho cg + Lf \cdot (\sin(\beta cg)) \quad (7)$$

$$\text{Turn radius } \rho r \text{ of rear shaft} = \rho cg - Lr \cdot (\sin(\beta cg)) \quad (8)$$

Accordingly, $$\text{reference rotational speed } \omega f0 \text{ of front wheel} = V \cdot (\rho f/\rho cg) \quad (9)$$

$$\text{reference rotational speed } \omega r0 \text{ of rear wheel} = V \cdot (\rho r/\rho cg) \quad (10)$$

From the above equation, the basic differential rotation ΔN0, that is, ΔN0=ωr0−ωf0 is calculated. Therefore, (ΔN−ΔN0) represents the actually occurring slip amount.

KT0 represents a proportionality coefficient which is preset in accordance with the transmission output torque To, and it is set to a larger value as the transmission output torque To increases, thereby reduce the differential rotation.

The yaw rate feedback torque setting unit 18d is supplied with the respective wheel speeds ωfl, ωfr, ωrl, ωrr, the handle angle θH and the yaw rate γ, and compares the actual yaw rate with a target yaw rate γ' which is determined by the vehicle speed V and the steering angle δf. Then, the yaw rate feedback torque Ty to be increased/reduced is calculated so that both the target yaw rate γ' and the actual yaw rate are coincident with each other, and output to the transfer clutch torque setting unit 18g.

Specifically, the target yaw rate γ' is calculated by the following equation (11).

$$\gamma' = (1/(1+T \cdot S)) \cdot (1/(1+A \cdot V^2)) \cdot (V/L) \cdot \delta f \quad (11)$$

Here, T represents a time constant, and s represents a Laplace operator.

A yaw rate deviation Δγ(=γ−γ') is calculated from the target yaw rate γ' and the actual yaw rate γ, and the yaw rate feedback torque Ty is set so that the yaw rate deviation Δγ is equal to zero.

The braking force control torque setting unit 18f is supplied with the respective wheel speeds ωfr, ωfr, ωrl, ωrr, the road-surface μ estimation value μe and the respective signals under under-steering inclination suppression, under over-steering inclination suppression or under non-operation. The brake controller 22 calculates the correction value Ttryh of the transfer clutch torque Ttr under under-steering inclination suppression or under over-steering inclination suppression and then outputs to the transfer clutch torque setting unit 18g.

The correction amount Ttryh is calculated as follows.

First, when the brake controller 22 is under the under-steering inclination suppression, a predetermined minute torque ΔT is multiplied by a constant Kus to calculate the correction amount Ttryh.

$$Ttryh = Kus \cdot \Delta T \quad (12)$$

Here, the constant Kus is variably set on the basis of the vehicle speed V and the road-surface μ estimation value μe, and it is increased as the vehicle speed V is higher while it is reduced as the road-surface μ estimation value μe is smaller. That is, as the vehicle speed V is higher, a larger correction is made to stabilize the vehicle behavior quickly. Furthermore, when the road-surface μ estimation value μe is small, the increase/reduction of the correction amount Ttryh is made minute to prevent the vehicle characteristic from varying rapidly. As the under-steering inclination is stronger, the correction is made so that the four-wheel driving of 50:50 of the front and rear wheels is carried out, that is, the transfer clutch torque Ttr is increased.

On the other hand, when the brake controller 22 is under the over-steering inclination suppression, the predetermined minute torque ΔT is multiplied by a constant Kos to calculate the correction amount Ttryh.

$$Ttryh = Kos \cdot \Delta T \quad (13)$$

Here, like the constant Kus, the constant Kos is variably set on the basis of the vehicle speed V and the road-surface μ estimation value μe, and it is increased as the vehicle speed V is higher while it is reduced as the road-surface μ estimation value μe is smaller. As the over-steering inclination is stronger, the correction is made so that the two-wheel driving of 100:0 of the front and rear wheels is carried out, that is, the transfer clutch torque Ttr is reduced.

In this embodiment, the vehicle is a FF-base four-wheel drive vehicle, and thus the increase/reduction of the transfer clutch torque Ttr is carried out as described above. In the case of a four-wheel drive vehicle of a front engine/rear drive wheel base (FR base), the joint of the transfer clutch torque is opposite to that in the above case.

The transfer clutch torque setting unit 18g is supplied with the respective signals under the under-steering inclination suppression, under the over-steering inclination suppression and under the non-actuation in the braking force control, the actuation signal of the electrically-driven parking brake controller 24, the signal from the clutch operation forcing release switch 46, and the torque sensitive torque Tt, the differential rotation sensitive torque Ts and the yaw rate feedback torque Ty, and it reads the correction amount Ttryh as occasion demands. On the basis of these data, the transfer clutch torque setting unit 18g sets the transfer clutch torque Ttr like the following cases and output it to the clutch driving unit 17.

When the electrically-driven parking brake 30 is under non-actuation and the braking force control is under non-actuation, the transfer clutch torque Ttr is set in the engine controller 35 as follows.

$$Ttr = Tt + Ts + Ty \quad (14)$$

Furthermore, when the electrically-driven parking brake 30 is under actuation and the braking force control is under non-actuation, the transfer clutch torque Ttr is set as follows by the transfer clutch torque setting unit 18g.

$$Ttr = Tcp \quad (15)$$

Here, Tcp represents the preset maximum value, that is, a value for directly coupling the front shaft and the rear shaft. Therefore, the electrically-driven parking brake 30 is actuated, and the braking force acting on the rear wheel side is transmitted to the front wheel side, so that the braking force acts on the front wheel side and the rear wheel side in a balanced manner and thus the destabilization of the vehicle can be effectively prevented. Furthermore, since the braking force acts also on the front wheel side, the maximum braking force can be enhanced.

Furthermore, when the ON signal is input from the clutch operation forcing release switch 46 to the transfer clutch torque setting unit 18g under the state where the electrically-driven parking brake 30 is actuated, the transfer clutch torque setting unit 18g sets the transfer clutch torque Ttr to zero to release the transfer clutch 15. This is carried out to take into consideration a case where a driver wants to slide the rear wheels by using the braking force of the electrically-driven parking brake 30.

$$Ttr = Tt + Ttryh \quad (16)$$

From the above judgment of the electrically-driven parking brake controller 24, it is impossible that the actuation of the electrically-driven parking brake 30 and the actuation of the braking force control occur at the same time. That is, in the case where the signal for correcting the vehicle behavior is input from the brake controller 22 to the electrically-driven parking brake controller 24, when the electrically-driven parking brake 30 is actuated, the actuation of the electrically-driven parking brake 30 is released in order to prevent the interference with the correction of the vehicle behavior by the brake controller 22.

Furthermore, when the ON signal is input from the clutch actuation compulsory release switch 46 to the transfer clutch torque setting unit 18g under the state where the electrically-driven parking brake 30 is actuated, the transfer clutch torque setting unit 18g sets the transfer clutch torque Ttr to zero to release the transfer clutch 15. This is carried out to take into consideration a case where a driver wants to slide the rear wheels by using the braking force of the electrically-driven parking brake 30

As described above, according to this embodiment of the present invention, when the electrically-driven parking brake 30 is actuated, the transfer clutch torque Ttr is set to the preset maximum value and output to the clutch driving unit 17 to directly couple the front shaft and the rear shaft. Therefore, the braking force acting on the rear wheel side is also transmitted to the front wheel side by the action of the electrically-driven parking brake 30, and the braking force acts on the front wheel side and the rear wheel side in a balanced manner, so that the destabilization of the vehicle can be effectively prevented. Furthermore, the braking force acts on the front wheel side, and thus the maximum braking force can be enhanced.

In the ACC system 25, the deceleration is carried out by the electrically-driven parking brake 30. Therefore, particularly in the low-speed following travel control at the traffic jam time or the like, even when the vehicle is frequently decelerated and stopped, satisfactory deceleration performance having sufficient durability can be achieved by actively using the characteristic of the electrically-driven parking brake 30 that the stop holding time is long. The ACC system 25 may be designed so that the electrically parking brake 30 is used only when the vehicle speed is not more than a predetermined speed, and the main brake system is used in the other cases.

Furthermore, when abnormality occurs in the main brake system, the electrically-driven parking brake 30 is actuated as a substitute for the main brake, and thus the safety when brake abnormality occurs can be enhanced, and the reliability of the brake performance can be enhanced.

The front-and-rear driving force control of this embodiment is merely an example, and the present invention is applicable to other front-and-rear driving force control. Furthermore, in this embodiment, the foregoing description is made on the vehicle having all the functions of the ACC system 25, the vehicle behavior control of the brake controller 22 and the substitute of the electrically-driven parking brake 30 when abnormality occurs in the main brake system. However, the present invention may be applied to a vehicle which does not have all the functions described above or a vehicle having at least one of these functions.

Still furthermore, the foregoing description is made on the vehicle using the electrical hydraulic type brake. However, the electrical hydraulic brake may be replaced by an electrical mechanical brake, and the brake driving unit 19 may be designed so that an electric motor is provided in the brake caliper of each wheel and the brake pad is pressed by the electric motor.

What is claimed is:

1. A control device for a four-wheel drive vehicle comprising:
    an electrically-driven parking brake control unit for actuating electrically-driven parking brakes provided to the rear wheels of the vehicle;
    a front-and-rear driving force distribution control unit for controlling a clutch unit provided between a front shaft and a rear shaft to variably control the driving force distribution between the front and rear wheels,
    wherein the front-and-rear driving force distribution control unit controls the clutch unit so that the front shaft and the rear shaft are directly coupled to each other when the electrically-driven parking brake control unit actuates the electrically-driven parking brakes; and
    a brake control unit for controlling actuation of a main brake other than the electrically-driven parking brakes,
    wherein the brake control unit actuates the electrically-driven parking brakes as a substitute for the main brake when abnormality of the main brake is detected.

2. The control device for the four-wheel drive vehicle according to claim 1, further comprising:
    a running control unit for detecting a preceding vehicle that runs ahead, and controlling deceleration of at least the vehicle concerned on the basis of information of the preceding vehicle, wherein the deceleration control of the running control unit is carried out by actuating the electrically-driven parking brake.

3. The control device for the four-wheel drive vehicle according to claim 2, further comprising: a vehicle behavior control unit for independently controlling the main brake other than the electrically-driven parking brake to control the behavior of the vehicle, wherein when the vehicle behavior control unit is actuated, the front-and-rear driving force distribution control unit cancels the control of directly coupling the front shaft and the rear shaft by the clutch unit when the electrically-driven parking brake is actuated, and the electrically-driven parking brake control unit cancels the actuation of the electrically-driven parking brake.

4. The control device for the four-wheel drive vehicle according to claim 1, further comprising:
    a vehicle behavior control unit for independently controlling the main brake other than the electrically-driven parking brake to control the behavior of the vehicle,
    wherein when the vehicle behavior control unit is actuated, the front-and-rear driving force distribution control unit cancels the control of directly coupling the front shaft and the rear shaft by the clutch unit when the electrically-driven parking brake is actuated, and the electrically-driven parking brake control unit cancels the actuation of the electrically-driven parking brake.

5. The control device for the four-wheel drive vehicle according to claim 4, wherein, when said vehicle behavior control unit is activated and the control of directly coupling is canceled, the front and rear driving force distribution determined by the clutch unit is variably set by using a sensed steering inclination suppressing correction amount.

6. The control device for the four-wheel drive vehicle according to claim 1, further comprising:
    switching means for selectively prohibiting the actuation of the front-and-rear driving force distribution control unit to directly couple the front shaft and the rear shaft through the clutch unit when the electrically-driven parking brake is actuated.

7. The control device for the four-wheel drive vehicle according to claim 1, further comprising:
    a vehicle behavior control unit for controlling the main brake other than the electrically-driven parking brake to control the behavior of the vehicle,
    wherein the electrically-driven parking brake control unit cancels the actuation of the electrically-driven parking brake when supplied with the signal for correcting the vehicle behavior from the vehicle behavior control unit.

8. A control device for a drive vehicle comprising:
    a front-and-rear driving force distribution control unit configured to control a front-and-rear driving force distribution mechanism which variably distributes a driving force to front and rear wheels of the vehicle; and
    an electrically-driven parking brake control unit configured to control a electrically-driven parking brake provided to the rear wheel of the vehicle;
    a brake control unit configured to control a main brake other than the electrically-driven parking brake,
    wherein the front-and-rear driving force distribution control unit controls the front-and-rear driving force distribution mechanism so as to transmit the driving force to both the front and rear wheels, when the electrically-driven parking brake control unit actuates the electrically-driven parking brake, and
    wherein the brake control unit actuates the electrically-driven parking brake as a substitute for the main brake when abnormality of the main brake is detected.

9. The control device according to claim 8, further comprising:
a running control unit for detecting a preceding vehicle that runs ahead, and controlling deceleration of at least the vehicle concerned on the basis of information of the preceding vehicle, wherein the deceleration control of the running control unit is carried out by actuating the electrically-driven parking brake.

10. The control device according to claim 8, further comprising:
a vehicle behavior control unit for independently controlling the main brake other than the electrically-driven parking brake to control the behavior of the vehicle,
wherein when the vehicle behavior control unit is actuated, the front-and-rear driving force distribution control unit cancels a control of directly coupling a front shaft and a rear shaft by the front-and-rear driving force distribution mechanism when the electrically-driven parking brake is actuated, and the electrically-driven parking brake control unit cancels the actuation of the electrically-driven parking brake.

11. The control device according to claim 8, further comprising:
switching means for selectively prohibiting the actuation of the front-and-rear driving force distribution control unit to directly couple a front shaft and a rear shaft through the front-and-rear driving force distribution mechanism when the electrically-driven parking brake is actuated.

12. The control device according to claim 8, further comprising:
a vehicle behavior control unit for controlling the main brake other than the electrically-driven parking brake to control the behavior of the vehicle,
wherein the electrically-driven parking brake control unit cancels the actuation of the electrically-driven parking brake when supplied with the signal for correcting the vehicle behavior from the vehicle behavior control unit.

13. A control device for a four-wheel drive vehicle comprising:
an electrically-driven parking brake control unit for actuating electrically-driven parking brakes provided to the rear wheels of the vehicle;
a front-and-rear driving force distribution control unit for controlling a clutch unit provided between a front shaft and a rear shaft to variably control the driving force distribution between the front and rear wheels,
wherein the front-and-rear driving force distribution control unit controls the clutch unit so that the front shaft and the rear shaft are directly coupled to each other when the electrically-driven parking brake control unit actuates the electrically-driven parking brakes; and
a vehicle behavior control unit for independently controlling the main brake other than the electrically-driven parking brake to control the behavior of the vehicle,
wherein when the vehicle behavior, control unit is actuated, the front-and-rear driving force distribution control means cancels the control of directly coupling the front shaft and the rear shaft by the clutch unit when the electrically-driven parking brake is actuated, and the electrically-driven parking brake control unit cancels the actuation of the electrically-driven parking brake.

14. The control device for the four-wheel drive vehicle according to claim 13, further comprising:
switching means for selectively prohibiting the actuation of the front-and-rear driving force distribution control unit to directly couple the front shaft and the rear shaft through the clutch unit when the electrically-driven parking brake is actuated.

15. The control device for the four-wheel drive vehicle according to claim 13, wherein, when said vehicle behavior control unit is activated and the control of directly coupling is canceled, the front and rear driving force distribution determined by the clutch unit is variably set by using a sensed steering inclination suppressing correction amount.

* * * * *